US009240857B2

(12) United States Patent
Elahmadi (10) Patent No.: US 9,240,857 B2
(45) Date of Patent: Jan. 19, 2016

(54) SYSTEM, METHOD AND FIBER-OPTIC TRANSCEIVER MODULE FOR BANDWIDTH EFFICIENT DISTORTION-TOLERANT TRANSMISSIONS FOR HIGH-BIT RATE FIBER OPTIC COMMUNICATIONS

(75) Inventor: Salam Elahmadi, Dallas, TX (US)

(73) Assignee: Menara Networks, Dallas, TX (US)

( * ) Notice: Subject to any disclaimer, the term of this patent is extended or adjusted under 35 U.S.C. 154(b) by 652 days.

(21) Appl. No.: 13/549,203

(22) Filed: Jul. 13, 2012

(65) Prior Publication Data

US 2013/0183040 A1  Jul. 18, 2013

Related U.S. Application Data

(60) Provisional application No. 61/588,057, filed on Jan. 18, 2012.

(51) Int. Cl.
*H04B 10/00* (2013.01)
*H04J 14/02* (2006.01)
*H04B 10/2507* (2013.01)
*H04B 10/50* (2013.01)
*H04B 10/60* (2013.01)
*H04L 27/26* (2006.01)
*H04L 27/34* (2006.01)

(52) U.S. Cl.
CPC ........ *H04J 14/0298* (2013.01); *H04B 10/2507* (2013.01); *H04B 10/50* (2013.01); *H04B 10/60* (2013.01); *H04J 14/02* (2013.01); *H04L 27/2646* (2013.01); *H04L 27/2697* (2013.01); *H04L 27/3488* (2013.01)

(58) Field of Classification Search
CPC ...... H04B 10/40; H04B 10/516; H04B 10/58; H04B 10/60; H04B 10/66; H04B 10/0791; H04B 10/0795; H04B 10/07951; H04B 10/07953
USPC ......... 398/76, 79, 77, 78, 183, 158, 159, 188, 398/162, 202, 208, 135, 136, 192, 193, 194, 398/195, 33, 147, 141, 209, 81, 137, 138, 398/139
See application file for complete search history.

(56) References Cited

U.S. PATENT DOCUMENTS

| 5,596,436 | A  | * | 1/1997  | Sargis et al. ..................... 398/76 |
| 7,574,135 | B2 | * | 8/2009  | Agazzi ............................. 398/76 |
| 2010/0034542 | A1 | * | 2/2010  | Armstrong .................... 398/158 |
| 2010/0158530 | A1 | * | 6/2010  | Soto et al. ....................... 398/79 |
| 2011/0286747 | A1 | * | 11/2011 | Lowery et al. ................ 398/115 |

* cited by examiner

*Primary Examiner* — Hanh Phan
(74) *Attorney, Agent, or Firm* — Rutan & Tucker LLP; William W. Schaal (57) ABSTRACT

According to one embodiment of the invention, fiber optic communications method is described. The method comprises a first operation of dynamically identifying frequencies at which spectral nulls occur in a signal received via an optical fiber, and thereafter, segregating communications over the optical fiber into a set of inter-null bands defined by the spectral nulls.

24 Claims, 11 Drawing Sheets

SYSTEM, METHOD AND FIBER-OPTIC TRANSCEIVER MODULE FOR BANDWIDTH EFFICIENT DISTORTION-TOLERANT TRANSMISSIONS FOR HIGH-BIT RATE FIBER OPTIC COMMUNICATIONS

CROSS REFERENCE TO RELATED APPLICATIONS

This application is based upon and claims the benefit of priority from U.S. Provisional Patent Application No. 61/588,057 filed Jan. 18, 2012, the entire contents of which are incorporated herein by reference.

FIELD

Embodiments of the invention generally relate to optical data links including fiber optic transmitters, receivers and transceivers. Particularly, embodiments of the invention relate to circuitry, device and method for identifying channel nulls and transmitting information in the frequency bands between these channel nulls.

GENERAL BACKGROUND

In order to lower the cost of communications, it has become desirable to increase data rate and the number of communication channels available for such communications. This is particularly true in fiber optic communication systems.

In fiber optic communication systems, wavelength division multiplexing (WDM) has been used over the same fiber optic communication link so that multiple channels of communication may be established over the same optical link. The multiple channels of communication are established at different center wavelengths of light. However, at high data transmission rates, fiber dispersion distorts the optical signal, which adversely affects reliability for correctly recovering data over long distance data transmissions.

In particular, for direct detect systems, fiber dispersion manifests itself as channel nulls in the power spectral density (PSD) of the transmitted signal. These "channel nulls" are substantial reductions in energy that may distort the perceived content within the signal. As optical communication links increase in distance, more channel nulls are experienced. In other words, optical signals experience more distortion as they travel over a longer optical communication link. For instance, 2-3 channel nulls may be experienced when the optical communication link is approximately two-hundred kilometers (200 Km) in length. However, approximately seven (7) channel nulls may be experienced when the optical communication link is approximately six-hundred kilometers (600 Km).

Hence, removal or mitigation of distortion experienced on these long-haul (single-mode) optical communication links would improve the operations of a network, especially for upcoming technologies where the optical fiber communication links are operating at bit rates greatly exceeding 10 gigabits per second such as 100 gigabits per second (100 Gbps) or more.

BRIEF DESCRIPTION OF THE DRAWINGS

Features and advantages of embodiments of the invention will become apparent from the following detailed description in which.

DETAILED DESCRIPTION

Embodiments of the invention set forth in the following detailed description generally relate to a method, device, software, and system for mitigating distortion that affect light pulses as they propagate over an optical fiber medium by avoiding data transmissions within channel nulls.

The embodiments of the invention are directed to circuitry that is designed to estimate null channel locations based on analysis of the optical fiber medium (e.g., distortion coefficient value and length of the optical fiber medium) or analysis of test signals propagated over the medium. Thereafter, data is organized for transmission within the inter-null bands, namely the frequency bands between the channel nulls.

Herein, certain terminology is used to describe features for embodiments of the invention. For example, an "optical system" generally refers to a device that includes logic adapted to transmit and/or receive signaling over an optical fiber medium. The system may further be adapted to process information within such optical signaling.

It is contemplated that the optical system may include hardware logic, including one or more of the following: (i) processing circuitry; (ii) one or more lasers for generating light pulses transmitted over the optical fiber medium; (iii) one or more optical detectors; and (iv) a non-transitory computer-readable storage media (e.g., a programmable circuit; a semiconductor memory such as a volatile memory such as random access memory "RAM," or non-volatile memory such as read-only memory, power-backed RAM, flash memory, phase-change memory or the like; a hard disk drive;

an optical disc drive; or any connector for receiving a portable memory device such as a Universal Serial Bus "USB" flash drive).

Additionally, the term "logic" is generally defined as hardware and/or software. As hardware, logic may include processing circuitry (e.g., a controller, a microprocessor, a digital signal processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of non-transitory storage medium (described above) or transitory computer-readable transmission media (e.g., electrical, optical, acoustical or other form of propagated signals such as carrier waves, infrared signals, digital signals).

The term "link" is broadly defined as a logical or physical communication path such as, for instance, one or more optical fibers. The term "band" constitutes a range of frequencies with a center frequency.

Lastly, the terms "or" and "and/or" as used herein are to be interpreted as an inclusive or meaning any one or any combination. Therefore, "A, B or C" and "A, B and/or C" mean "any of the following: A; B; C; A and B; A and C; B and C; A, B and C." An exception to this definition will occur only when a combination of elements, functions, operations or acts are in some way inherently mutually exclusive.

Figure 1:
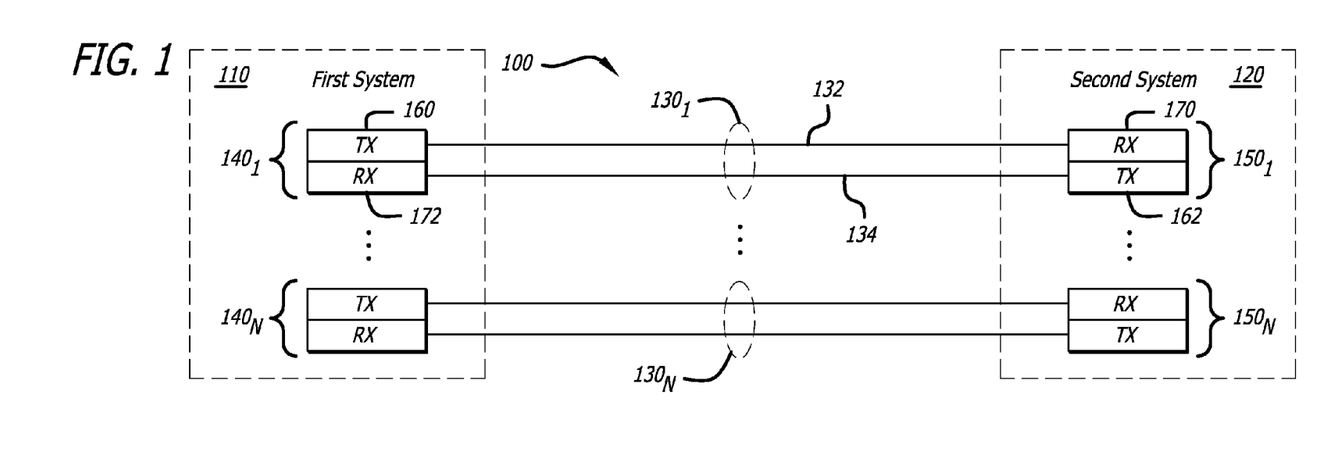
FIG. 1 is a general, exemplary embodiment of a fiber optic communication system.

Referring now to FIG. 1, a general embodiment of a fiber optic communication system 100 is shown. In the fiber optic communication system 100, a first system 110 is optically coupled to a second system 120 by means of optical communication channels $130_1$-$130_N$ (where N≥1). Each optical communication channel $130_1$-$130_N$ may be bi-directional, and if so, includes a first fiber optic communication link 132 and a second fiber optic communication link 134. If only unidirectional communications are desired, one of the first or second fiber optic communication links 132 or 134 can suffice for the communication channel depending upon the desired direction of the data transfer. Fiber optic communication link 132 and 134 may be implemented within a single fiber optic cable or within separate cables.

Wavelength division multiplexing (WDM) may be used over each of the fiber optic communication links 132 and/or 134 to accommodate multiple channels of communications over the fiber optic cable. Bi-directional communication may also be provided over one fiber optic communication link 132 or 134 by using different wavelengths of light within the same fiber optic cable.

First system 110 comprises one or more fiber-optic transceiver modules $140_1$-$140_N$. Similarly, second system 120 includes one or more fiber-optic transceiver modules $150_1$-$150_N$. Each of the fiber-optic transceiver modules $140_1$-$140_N$ and $150_1$-$150_N$ include a transmitter (TX) 160 and/or receiver (RX) 170 in order to provide bi-directional communications. If unidirectional communication is desirable, a transmitter TX 160 may be placed within first system 110 while a receiver RX 170 would be placed at second system 120 instead of deployment of a transceiver at both systems 110 and 120.

Photons or light signals (e.g., data) are generated by transmitter TX 160 in first system 110; transmitted through a fiber optic cable associated with link 132; and received by receiver RX 170 of second system 120. On the other hand, transmitter TX 162 of second system 120 can generate photons or light signals (e.g., data) and transmit them through a fiber optic cable, via link 134, which can then be received by receiver RX 172 of first system 110. Thus, communication system 100 can utilize photons or light signals to bi-directionally communicate data through the fiber optic cable(s) and its respective links between first system 110 and second system 120.

Figure 2A:
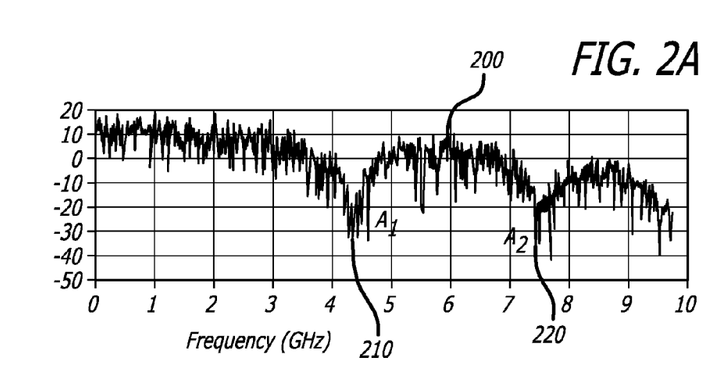
FIG. 2A is a first exemplary embodiment of the power spectral density (PSD) for signaling propagating over an optical fiber medium of a first length.
Figure 2B:
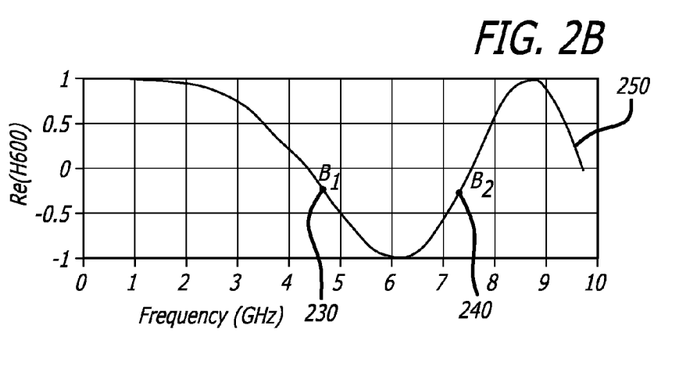
FIG. 2B is an exemplary embodiment of the fiber response for signaling propagating over an optical fiber medium as illustrated in FIG. 2A.

Referring to FIGS. 2A and 2B, detailed embodiments of the power spectral density (PSD) of illustrative signaling propagating over optical fiber medium, such as first fiber optic communication link 132 of FIG. 1, is shown. As shown in FIG. 2A, for link 132 having a two-hundred kilometer (z=200 Km) length with a prescribed distortion coefficient of the fiber ($\beta_2$), null channels ($A_1$ 210, $A_2$ 220) for PSD 200 are detected around 4.3 Gigahertz (GHz) and 7.5 GHz frequency ranges. Channel nulls ($A_1$, $A_2$) 210 and 220 coincide with in-phase components ($B_1$ 230, $B_2$ 240) of fiber response 250 as illustrated in FIG. 2B.

The equation for estimating channel nulls is dependent on length (z) and the distortion (dispersion) coefficient ($\beta_2$) and may be represented by equation (1) as shown below (where "k" is merely a constant corresponding to the particular ordering of the channel null (e.g., k=0 for first channel null, k=1 for the second channel null, etc.):

$$f = \frac{1}{2\pi}\sqrt{\frac{(2k+1)\pi}{\beta_2 z}} \quad (1)$$

Figure 2C:
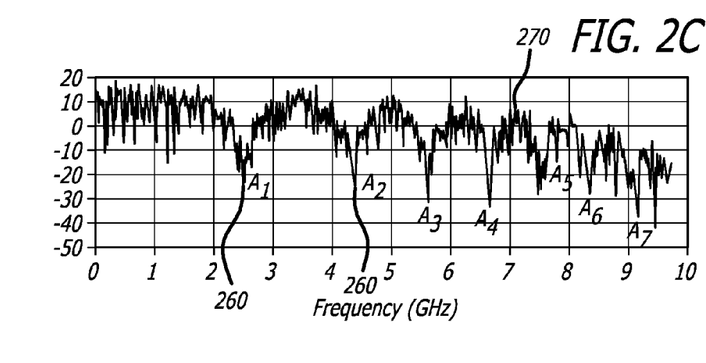
FIG. 2C is a second exemplary embodiment of the power spectral density (PSD) for signaling propagating over an optical fiber medium of a second length.
Figure 2D:
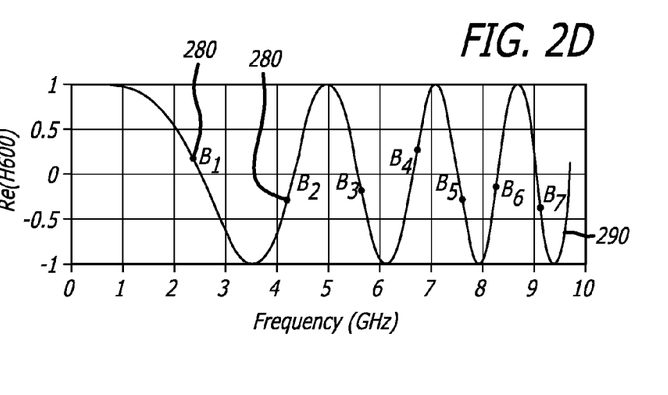
FIG. 2D is an exemplary embodiment of the fiber response for signaling propagating over an optical fiber medium as illustrated in FIG. 2C.

Similarly, as shown in FIG. 2C, for link 132 having a six-hundred kilometer (600 Km) length with a prescribed distortion coefficient of the fiber ($\beta_2$), channel nulls 260 ($A_1$-$A_7$) for PSD 270 are detected around 2.5 GHz, 4.3 GHz, 5.6 GHz, 6.6 GHz, 7.5 GHz, 8.3 GHz and 9.1 GHz frequency ranges, respectively. Channel nulls ($A_1$-$A_7$) 260 coincide with in-phase components ($B_1$-$B_7$) 280 of fiber response 290 as illustrated in FIG. 2D.

Figure 3:
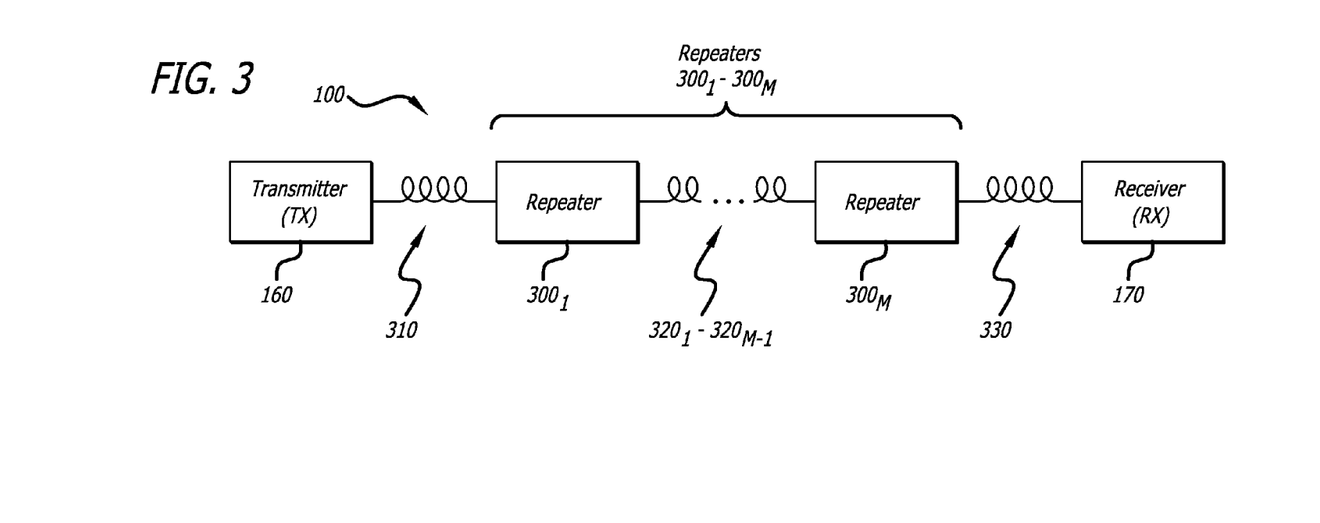
FIG. 3 is a detailed, exemplary embodiment of the fiber optic communication system.

Referring now to FIG. 3, a more detailed embodiment of fiber optic communication system 100 is shown. Herein, fiber optic communication system 100 is a long haul fiber optic communications channel with one or more repeaters $300_1$-$300_M$ (M≥1) between the ends of the communications channel. While such communications involve a unidirectional channel from transmitter 160 to targeted receiver 170, of course, it is contemplated that fiber optic communication system 100 can be readily expanded to support bi-directional communications.

From first transmitter 160 to a first repeater $300_1$ is a first fiber optic cable 310. Between repeaters $300_1$-$300_M$ are fiber optic cables $320_1$-$320_{M-1}$. Between the last repeater $300_M$ and the last receiver 170 is another fiber optic cable 330. The lengths of the fiber optic cable 310, fiber optic cables $320_1$-$320_{M-1}$, and fiber optic cable 330 are typically as large as possible in order to reduce the number of repeaters $300_1$-$300_M$.

Each repeater $300_1$-$300_M$ includes at least one receiver electrically coupled to a transmitter. In one embodiment, however, each repeater $300_1$-$300_M$ may include one or more transceivers.

Figure 4:
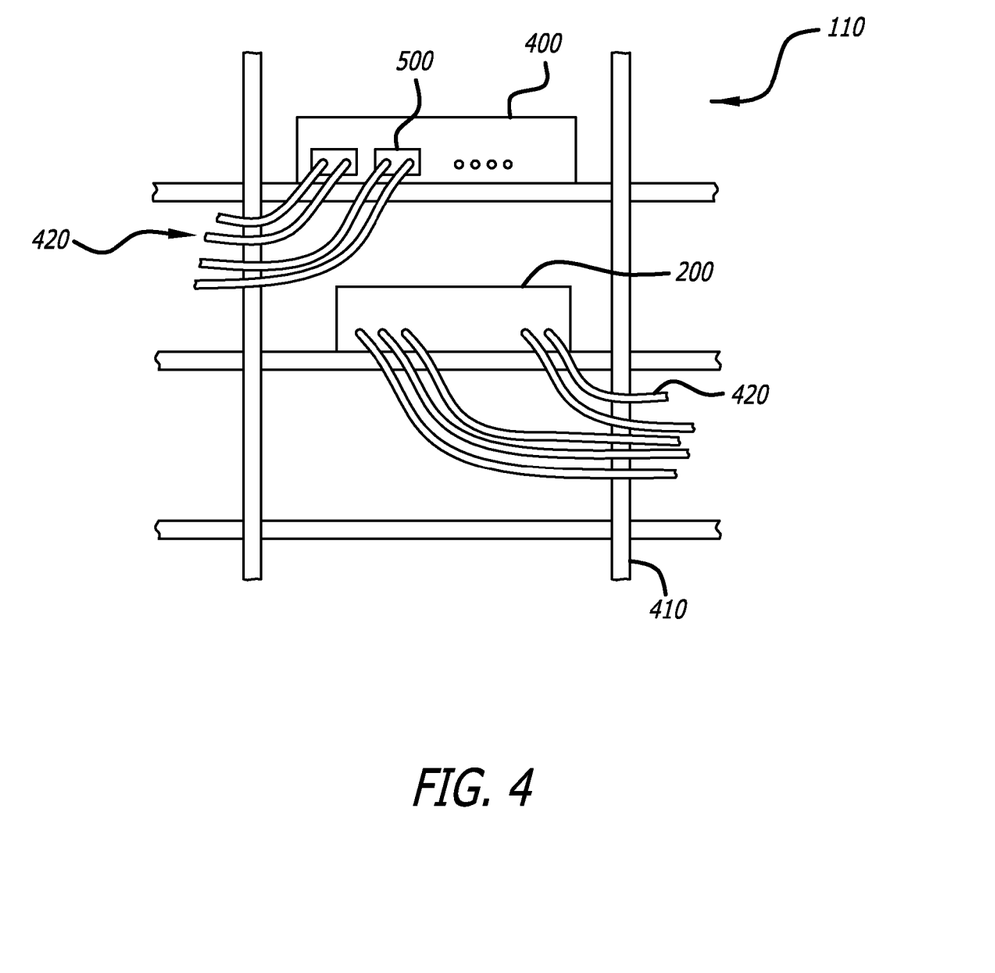
FIG. 4 illustrates a perspective embodiment of a first system of FIG. 1.

FIG. 4 illustrates a perspective embodiment of first system 110. As shown, first system 110 comprises a plurality of fiber-optic subsystems 400 (e.g., optical routers, bridges, or any optical transmitting and/or receiving components) that are positioned in close proximity to each other. For instance, as an illustrative example, a number of fiber-optic subsystems 400 may be positioned on a rack 410 and coupled to fiber optic cables 420 that interconnect first system 110 with other systems in different geographic areas. Each of the fiber-optic subsystems 400 comprises at least one fiber-optic module 500 operating as either (i) a transceiver (e.g., transceiver module 140₁), (ii) a transmitter, or (iii) a receiver.

Figure 5:
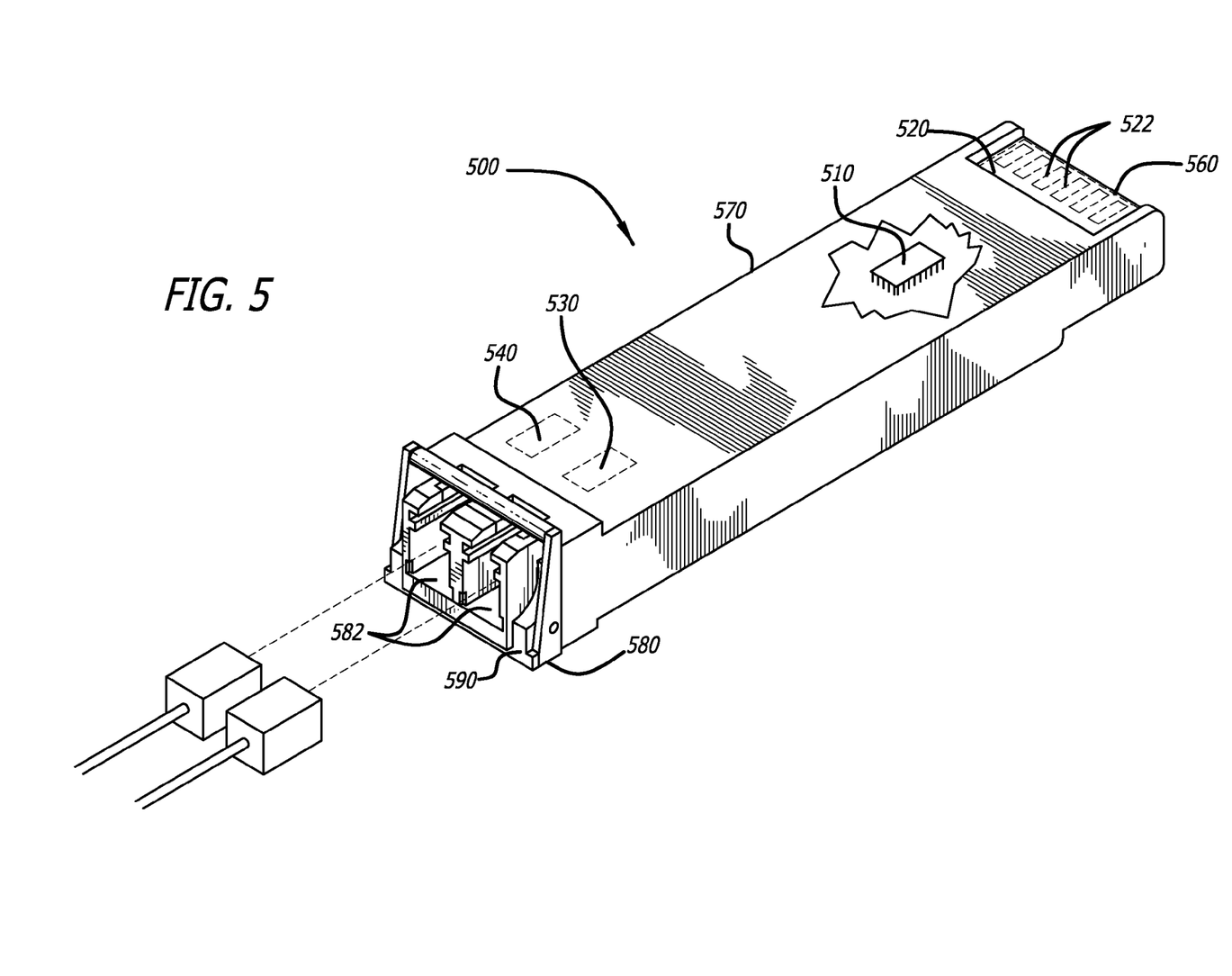
FIG. 5 is an exemplary block diagram of a fiber-optic module of FIG. 1.

Referring now to FIG. 5, an exemplary of a fiber-optic module 500 is illustrated. As shown, fiber-optic module 500 includes an integrated circuit 510 mounted therein to a printed circuit board 520 that incorporates embodiments of the invention (e.g., at portions of transmitter logic 800 of FIG. 8 and/or receiver logic 1000 of FIG. 10). As discussed previously, integrated circuit 510 may be one or more application specific integrated circuits (ASICs) to support the electronics of transmitter and/or receiver. Fiber-optic module 500 further includes a light transmitter 530 (e.g., an electrical-to-optical "EO" converter) and/or a light receiver 540 (e.g., an optical-to-electrical "OE" converter). Fiber-optic module 500 may be compatible with the 10 gigabit per second (10 GPS) small form-factor pluggable multi-source agreement (XFP), 100 GPS form-factors or other proprietary or standard packages.

Printed circuit board 520 includes top and bottom pads (top pads 522 illustrated) to form an edge connector 560 to couple to a socket of a host printed circuit board (not shown). A housing 570 is positioned around printed circuit board 520 to protect and shield integrated circuit 510. A front fiber optic plug receptacle 580 is provided with openings 582 to interface with one or more fiber optic cables and their plugs. A mechanical latch/release mechanism 590 may be provided as part of the fiber-optic module 500. While fiber-optic module 500 has been described has having both light transmission and light reception capability, it may be a fiber optic transmitter module with light transmission only or a fiber optic receiver module with light reception only.

Figure 6A:
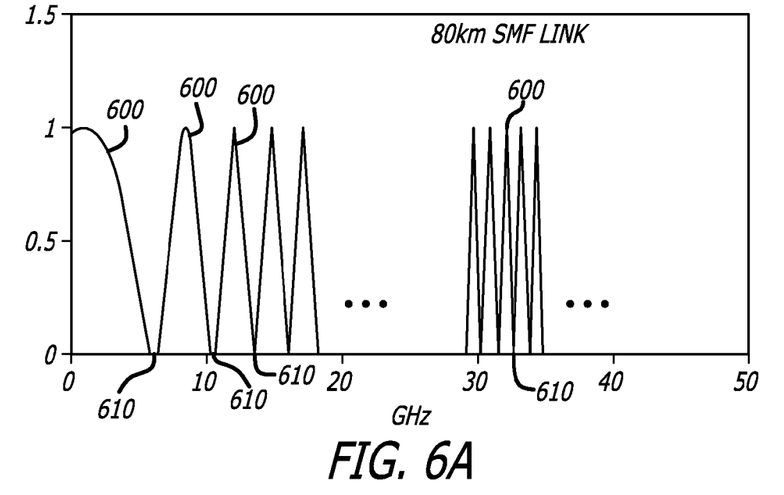
FIGS. 6A and 6B are illustrative embodiments of inter-null band multiplexing operations.
Figure 6B:
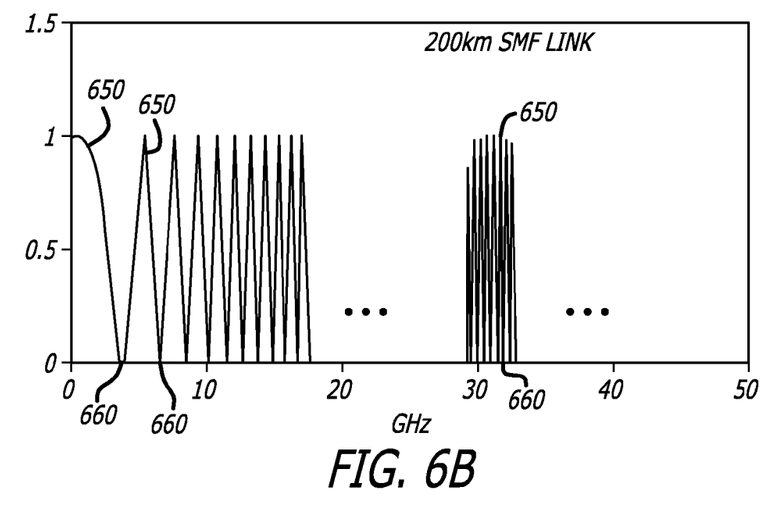

Referring now to FIGS. 6A and 6B, illustrative embodiments of inter-null band multiplexing operations are shown. Herein, frequency sub-bands 600 and 650 between channel nulls 610 and 660 are available for data transmission. As illustrated in FIG. 6A, for example, the location and bandwidth of frequency sub-bands 600 may be established as the frequency ranges between neighboring channel nulls 610 as computed from equation (1) as set forth above. As the RF carrier frequency increases, the bandwidth associated with the frequency sub-bands decreases. For instance, a frequency sub-band up to first channel null 610 (leftmost channel null in FIG. 6A) is greater than the frequency sub-band from the first channel null to a second channel null.

In order to mitigate non-linear signal distortion, which is caused by interactions between sub-phase modulation and dispersion effects, data is transmitted in frequency sub-bands 600 only (i.e. excluding data transmissions at frequencies associated with the channel nulls). This transmission technique, referred to as "inter-null band multiplexing" or "INBM", mitigates dispersion so that the optical fiber behaves as if it is a dispersion-free medium. In other words, non-linear distortion of the optical signal can be greatly mitigated, even for long-haul transmissions (e.g., data transmissions over an optical fiber cable greater than 1000 km in length).

INBM also provides additional benefits. For instance, INBM also enables a variety of well-established modulation techniques in wireless and satellite communications to be used for transmissions in each frequency sub-band over the optical fiber. Examples of these types of modulation techniques include, but are not limited or restricted to Orthogonal Frequency Division Multiplexing (OFDM), multi-level RF modulation (e.g., Quadrature Phase Shift Keying "QPSK", Quadrature Amplitude Modulation "QAM", etc.) or Trellis-coded modulation.

Additionally, INBM is a non-coherent technique, namely that it requires no coherent detection. It is accomplished by controlling the transmission of data by modulating the intensity of the light for the optical signal using a radio-frequency (RF) carrier. Since there is no modulation of the phase of the light, normally also required for coherent modulation, INBM greatly reduces the complexity, form factor and power usage of the transmitter and/or receiver by eliminating the need for components associated with coherent detection/modulation.

Figure 7:
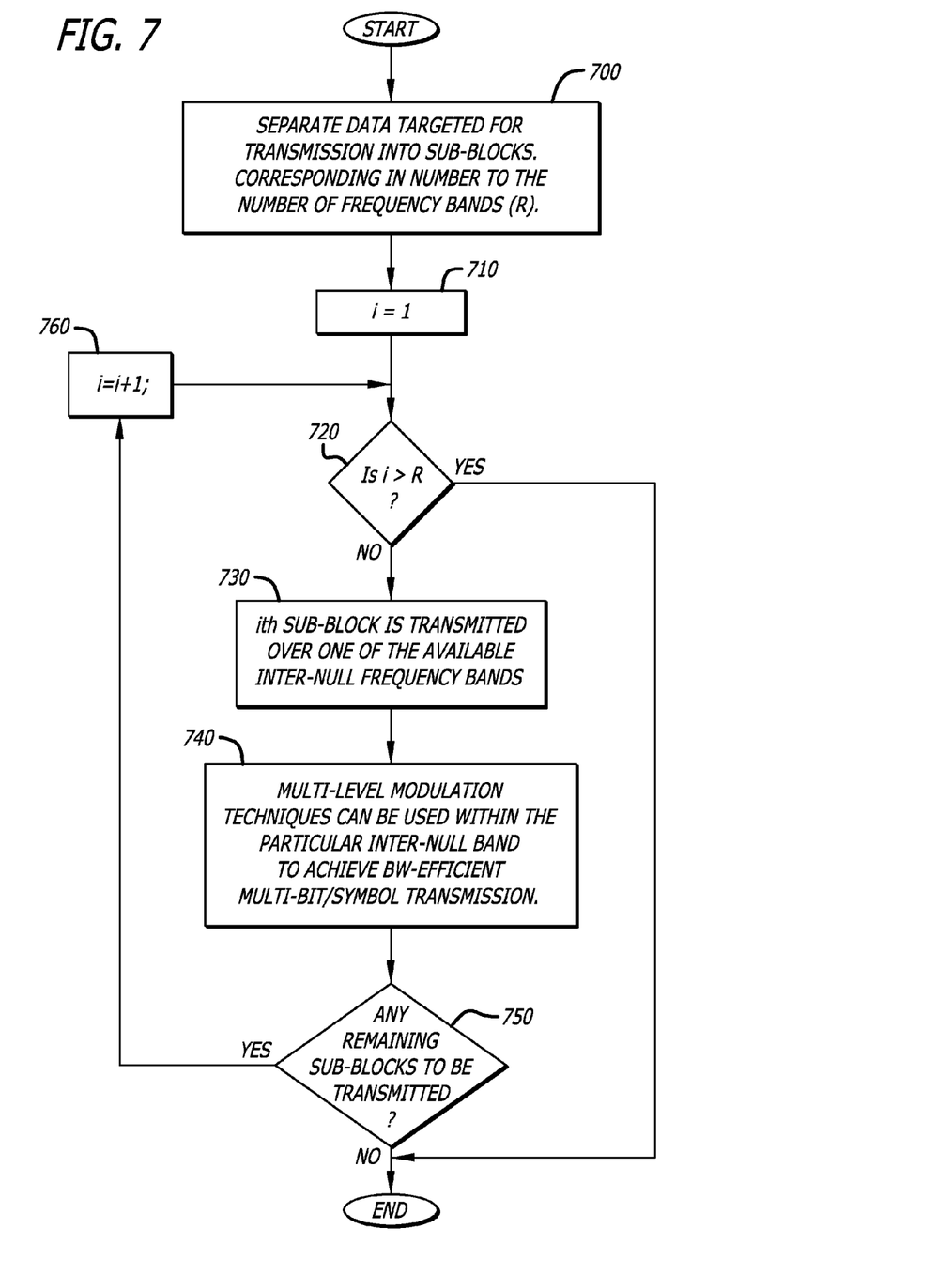
FIG. 7 illustrates an exemplary flowchart illustrating operations of the INBM-based transmitter is shown.

Referring to FIG. 7, an illustrative flowchart illustrating operations of the INBM-based transmitter is shown. Herein, a dispersive fiber channel can be viewed as a collection of contiguous sub-channels (or frequency bands) separate by channel nulls. The number of frequency bands (R) is dependent on the number of channel nulls. INBM separates the data targeted for transmission in sub-blocks (block 700). Each sub-block is to be transmitted over an available inter-null frequency bands (blocks 710, 720 and 730).

According to one embodiment, multi-level modulation techniques can be used within each band to achieve bandwidth efficient multi-bit/symbol transmission (block 740). For instance, multi-dimensional Trellis coded modulation can be used to achieve high bandwidth efficiency while also providing several decibels (dBs) of coding gain. This process is iterative for each sub-block (block 750).

Figure 8:
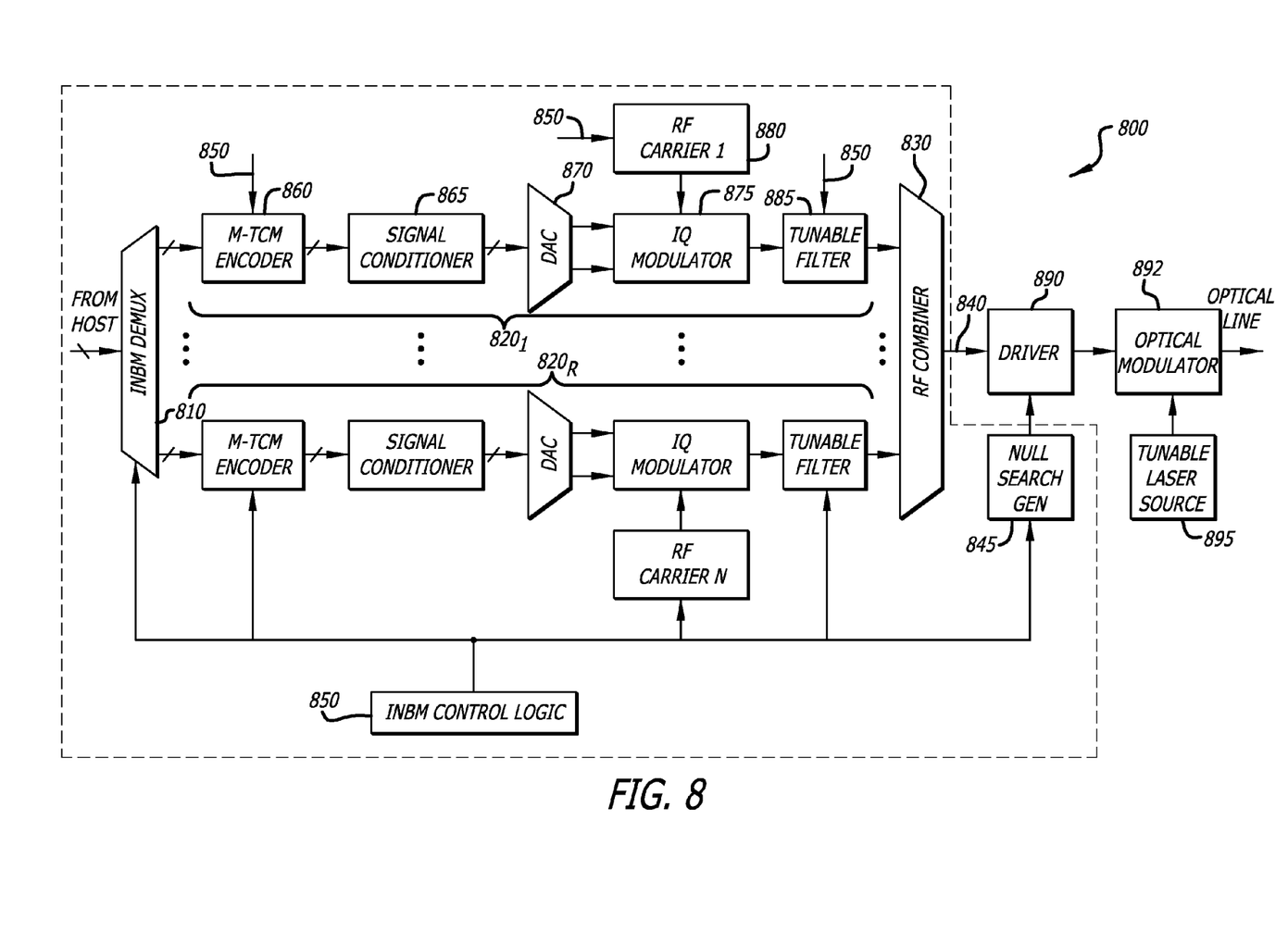
FIG. 8 illustrates an exemplary embodiment of transmitter logic for supporting inter-null band data transmissions.

FIG. 8 illustrates an embodiment of transmitter logic 800 for supporting inter-null band data transmissions. Transmitter logic 800 comprises an inter-null band (INB) multiplexer 810 and signaling logic $820_1$-$820_R$ (R≥1), each being adapted to support a different sub-band frequency range between channel nulls. Signaling logic $820_1$-$820_R$ is coupled to a radio frequency (RF) combiner 830 that creates a composite signal 840. The operations of INB multiplexer 810, signaling logic $820_1$-$820_R$, and RF combiner 830 are controlled by INBM control logic 850, which may be software executed by processing circuitry that is either (i) integrated within an integrated circuit including INB multiplexer 810, signaling logic $820_1$-$820_R$, RF combiner 830 and optionally null search generator 845 as represented by dashed lines, or (ii) implemented as an external control source.

More specifically, for supporting 100 gigabits per second (100 Gbps) transmissions, transmitter logic 800 receives data as ten (10) channels each operating at 10 Gbps. According to one embodiment, the data may be provided from a host device such as a computing device (e.g., computer, main frame, server, access point, etc.), processing circuitry or the like.

Thereafter, the data is segmented into "R" segments of blocks by INB multiplexer 810, where "R" denotes the number of inter-null frequency bands that can be supported for transmission. According to one embodiment of the invention, one or more sub-blocks are allocated to corresponding signaling logic $820_1$-$820_R$, which are collectively responsible for data transmissions over inter-null frequency bands. As a result, it is contemplated that the number of sub-blocks routed to a particular signaling logic $820_i$ may vary, depending on which inter-null channel that signaling logic $820_i$ is assigned. The reason is that the bandwidth of each inter-null frequency band varies depending on its center frequency as shown in FIGS. 6A and/or 6B.

It is contemplated that transmitter logic 800 may be configured with a maximum number (R) of signaling logic $820_1$-$820_R$, where any unused signaling logic components may be powered off.

According to one signaling logic $820_1$, the allocated sub-blocks of data are routed to an encoder 860 (e.g., M-TCM, OFDM, QAM, etc.), which encodes the data in order to improve transmission efficiency. The encoded data is provided to a signal conditioner 865, which is logic that is configured to compensate for distortion caused by a driver 890 and optical modulator 892 that converts data from the resultant RF composite signal into optical pulses for transmission over the optical fiber medium. In other words, signal conditioner 865 pre-distorts the encoded data to compensate for distortion that will be caused by components later in the optical transmission path.

The distortion-compensated, encoded data is routed to a digital-to-analog converter (DAC) 870 which converts the received digital data into an analog signal having two components, an inphase component (I) and a quadrature component (Q). The IQ signals are provided as input to IQ modulator 875 for modulation of a RF carrier signal 880 which is centered at a frequency band associated with this particular signaling logic $820_1$. The RF-modulated signal is passed through a filter 885 (e.g., bandpass filter) to ensure that RF-modulated signal is confined to the inter-null frequency band associated with signaling logic $820_1$.

RF combiner 830 receives the RF-modulated signals from different signaling logic $820_1$-$820_R$ to produce composite signal 840. Composite signal 840 is provided to driver 890 which is responsible for driving optical modulator 892 that, along with tunable laser source 895, produces optical signals to propagate data contained in RF composite signal 840.

Upon start-up of the module (transmitter), null search generation logic 845 controlled by INBM control logic 850 will be sending a succession of tones (e.g. characterization signal) that covers a frequency range between a minimum frequency and a maximum frequency (e.g. 0-30 GHz) and awaits for response signaling from the receiver by sweeping the frequency range for detecting tones and returning information as to which tones were detected by the receiver. The detected tones are used to represent which channels are being used for optical data transmissions, which may be detected by receiver logic 1000 of FIG. 10. Upon any detection of a loss of signal (LOS), processing circuitry within transmitter logic 800 restarts the INBM control logic 850 to compute the detected available channels using null search generation logic 845.

It is contemplated that null search generation logic 845 is optional as null locations can be estimated based on the distance of the optical fiber (z) is known and the dispersion coefficient of the optical fiber medium ($\beta_2$) as set forth above in equation (1).

Figure 9:
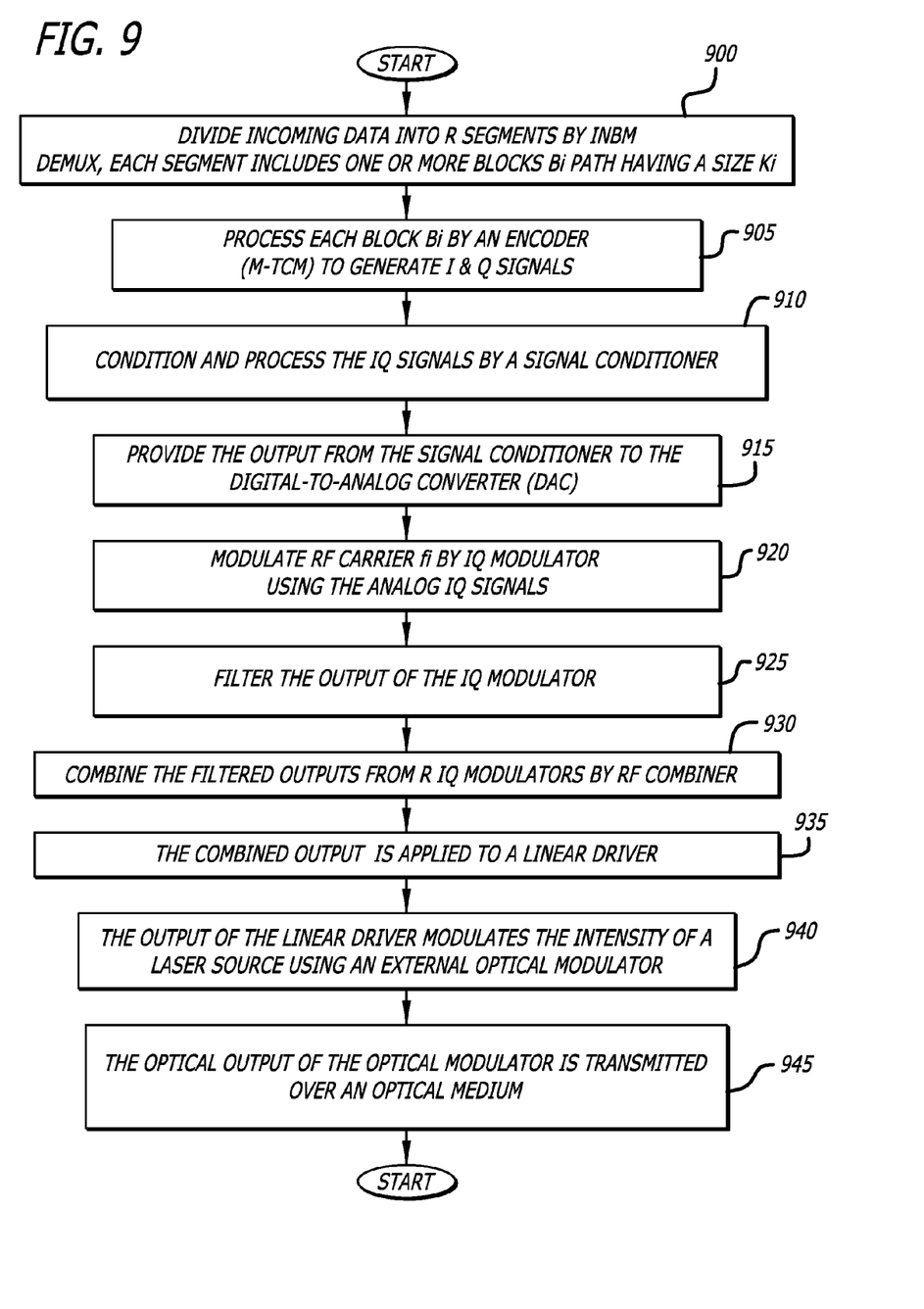
FIG. 9 illustrates an exemplary embodiment of the flowchart highlighting operations of the transmitter logic of FIG. 8.

Referring now to FIG. 9, an illustrative embodiment of the operations of transmitter logic 800 of FIG. 8 is shown.

First, incoming data from host is divided into R segments of blocks by the INBM Demultiplexer, each segment including one or more blocks Bi each having a size Ki (block 900). The number of blocks in a particular series, and block size Ki are determined by INBM control logic 850 of FIG. 8 based on its knowledge of the null channel locations and the desired data transmission rate (e.g., bits/second/hertz). INBM control logic 850 may be integrated within an integrated circuit including INBM multiplexer 810, signaling logic $820_1$-$820_R$, RF combiner 830 and optionally null search generator 845, as illustrated by dashed lines, or may be implemented as an external control source.

According to one embodiment of the invention, each block Bi is processed by a multilevel Trellis-coded encoder (M-TCM) that encodes the data to generate Inphase (I) & Quadrature (Q) signals (block 905). The M-TCM encoder allows for the transmission of J bits/symbol (J>1) thereby conserving bandwidth while still allowing for high-rate data transmission through an increase in bandwidth efficiency (bits/second/Hertz).

In one embodiment, the M-TCM encoder could be chosen to generate of a multi-dimensional PSK or QAM constellation. Herein, multiple constellations are combined together to produce multi-bit symbols. For example, in a higher-order PSK technique such as 2×8-PSK for example, a transmission rate of 3.5 bits/symbol may be achieved, thereby increasing the bandwidth efficiency. In another embodiment, in order to further increase bandwidth efficiency, two techniques (TCM, Partial Response) may be combined. "Partial Response" is a technique that is involved in the creation of a controlled amount of inter-symbol interference into the transmitted signal. This interference may be removed at the receiver using Maximum Likelihood estimation. This technique, which may involve the generation of TCM constellation followed by the application of Partial Response may enable an increased bandwidth efficiency (e.g., increased bits/second/symbol).

TCM is an error correction code that allows for the correction of errors. As an ancillary benefit, the M-TCM encoder also provides for a coding gain by utilizing a (k/k+1) block or convolutional encoder to help improve the bit error rate.

The constellation size is determined by the INBM control logic 850 of FIG. 8 given the bandwidth efficiency (bits/second/Hertz).

Of course, it is contemplated that the M-TCM encoder can be replaced by an OFDM modulator.

Referring still to FIG. 9, the IQ signals are further conditioned and processed by the signal conditioner (block 910). For example the signal can be pre-distorted to compensate for components and/or channel nonlinearities. The output of the signal conditioner is received by a digital-to-analog converter (DAC) and the resultant analog IQ signals from the DAC are used by an IQ modulator to modulate an RF carrier $f_i$ (blocks 915 and 920).

The output of the modulated signals is filtered using a bandpass filter centered at $f_i$ and having a bandwidth $BW_i$ (block 925). The carrier frequency and bandpass center frequency $f_i$ is selected using the INBM control logic.

All "R" outputs from the bandpass filters from the signaling logic corresponding to each of the inter-null frequency bands is combined using a broadband RF combiner (block 930). The output of the RF combiner is applied to a linear driver (block 935). The output of the linear driver modulates the intensity of a laser source (where tunable) using an external optical modulator (block 940).

The optical output of the optical modulator is transmitted over an optical medium such as an optical fiber (block 945).

Figure 10:
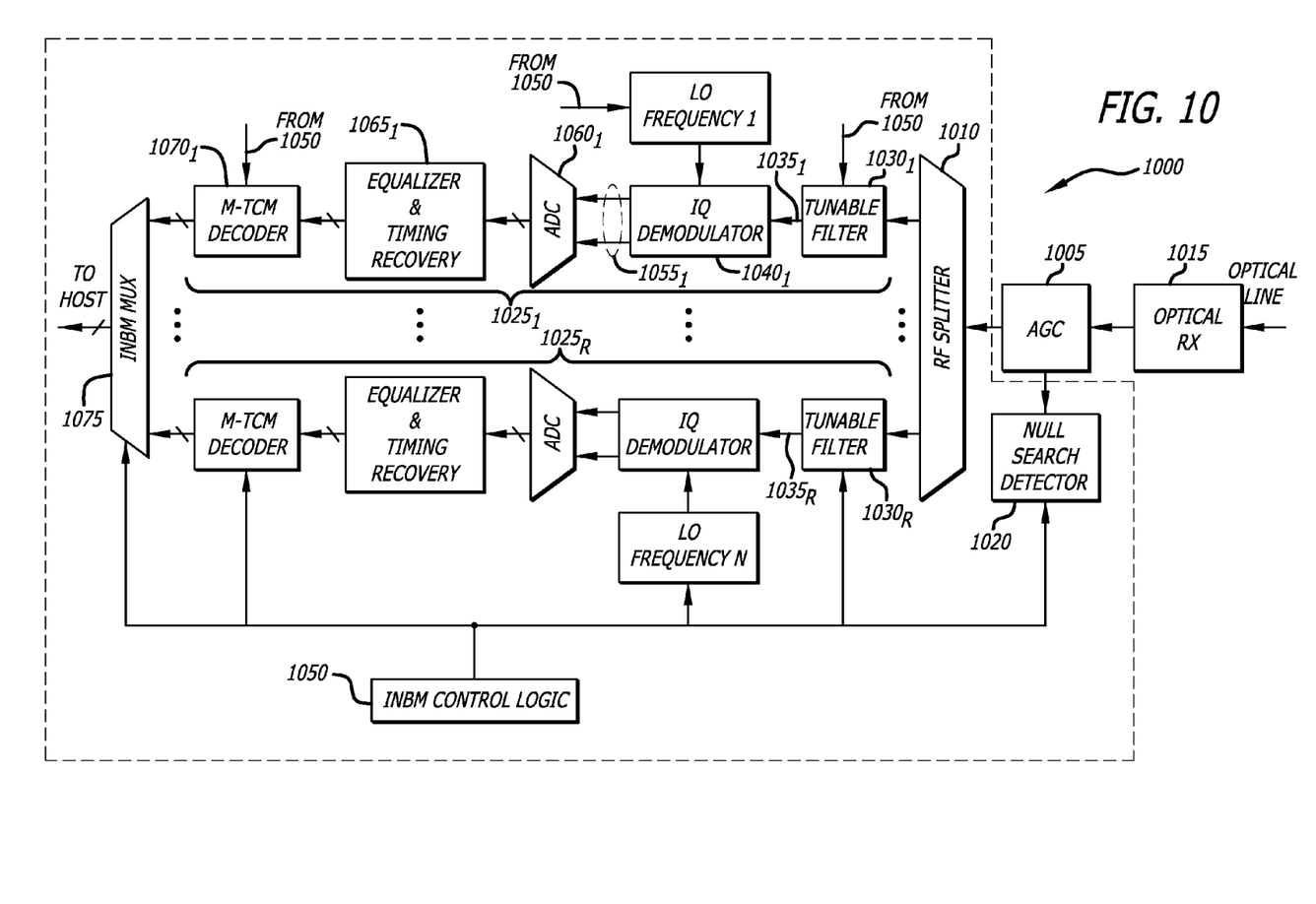
FIG. 10 illustrates an exemplary embodiment of receiver logic for supporting inter-null band data transmissions.

FIG. 10 illustrates an embodiment of receiver logic 1000 for supporting inter-null band data transmissions. Receiver logic 1000 comprises an automatic gain controller (AGC) 1005 that maintains the gain of the incoming optical signal constant before routing the same to an RF splitter 1010. Furthermore, the optical signal is converted to an electrical signal by optical receiver 1015 before routing to AGC 1005.

It is contemplated that null search generation logic 1020 is optional as null locations can be estimated since the distance of the optical fiber (z) is known and the dispersion coefficient of the optical fiber medium ($\beta_2$) is known. Upon start-up of the module (receiver), null search detector logic 1020 controlled by INBM control logic 1050 is adapted to detect a succession of tones by sweeping the available bandwidth (e.g. 0-30 GHz) and, for those tones that are detected, a response (not shown) is sent back to the transmitter to identify which channels are detected by the receiver.

RF splitting 1010 receives the electrical signal, which is a composite signal formed from RF-modulated signals, and separates each RF-modulated signal therefrom. The number of RF-modulated signals may be based on the number of channels "R" used in supporting data throughput as targeted by the transmitter logic 800 of FIG. 8, such as ten (10) channels each operating at 10 Gbps. The RF-modulated signals are respectively routed to signaling logic $1025_1$-$1025_R$.

Discussing the operations for one of signaling logic $1025_1$-$1025_R$ (e.g., signaling logic $1025_1$), a RF-modulated signal $1035_1$ has been filtered by a corresponding tunable bandpass filter $1030_1$ to ensure that RF-modulated signal $1035_1$ is confined to the inter-null frequency band associated with signaling logic $1025_1$. Thereafter, IQ demodulator $1040_1$ demodulates RF-modulated signal $1035_1$ from bandpass filter $1030_1$ using a local oscillator (LO) frequency $1045_1$ set approximately to a targeted center frequency associated with this particular signaling logic $1025_1$. The resulting signal, a recovered analog IQ signal $1055_1$, is provided to an analog-to-digital converter (ADC) $1060_1$.

ADC $1060_1$ includes an anti-aliasing filter that converts the analog IQ signal $1055_1$ into a multi-bit digital stream that is provided to equalizer & timing recovery logic $1065_1$, which is logic that is configured to compensate for distortion caused by AGC 1005 before supplying the data to decoder $1070_1$. Decoder $1070_1$ matches the encoding operation performed at transmitter 800 of FIG. 8.

Thereafter, the data that is segmented and routed over "R" data paths via signaling logic $1025_1$-$1025_R$ are aggregated to provide blocks by INB multiplexer 1075, where "R" denotes the number of inter-null frequency bands that can be supported for transmission. According to one embodiment of the invention, blocks received via allocated signaling logic $1025_1$-$1025_R$ are aggregated and sent to a host device (e.g., processor).

Figure 11:
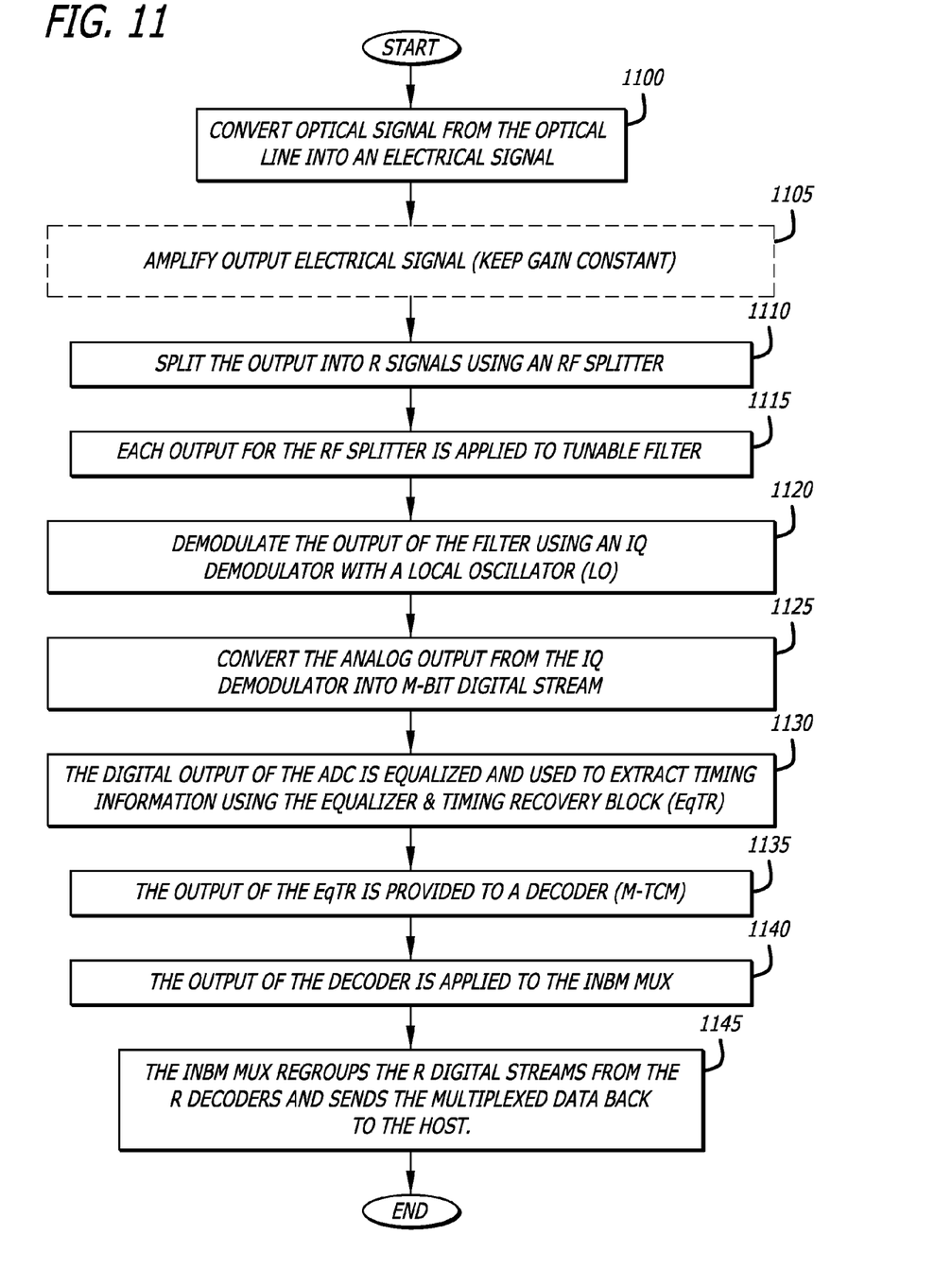
FIG. 11 illustrates an exemplary embodiment of the flowchart highlighting operations of the receiver logic of FIG. 10.

Referring now to FIG. 11, an illustrative flowchart of operations performed by the receiver logic for supporting inter-null band data transmissions is shown. First, an optical signal from the optical fiber medium is converted to an electrical signal using an optical receiver such as a PIN photodiode (block 1100). The electrical output of the optical receiver is amplified and its gain kept constant using a linear automatic gain control block (AGC) as shown in block 1105. The output of the AGC is split into R signals using an RF splitter, where "R" is determined by the INBM algorithm (block 1110). "R" would be consistent with the number of channels selected at the transmission stage.

Each output for the RF splitter is then applied to tunable bandpass filter (block 1115). The output of the bandpass filter is demodulated using an IQ demodulator with a local oscillator "LO" (block 1120). The bandwidth, center frequency of the bandpass filter and LO frequency are determined by the INBM control logic.

The output of the IQ demodulator is applied to an analog-to-digital converter (ADC), which includes an anti-aliasing filter and converts the input analog signal into a multi-bit digital stream (block 1125). The digital output of the ADC is equalized and used to extract timing information using the Equalizer & Timing Recovery block (EqTR), namely a signal conditioner (block 1130). When partial-response signaling is used in the TX, a Viterbi equalizer will be enabled in the EqTR block in order to recover the Power Response (PR) signal.

The output of the EqTR is applied to an M-TCM decoder (matched to the M-TCM encoder of the transmission stage) as set forth in block 1135. The Output of the M-TCM decoder is applied to the INBM multiplexer (block 1140). The INBM Mux regroups the "R" digital streams from the "R" M-TCM decoders and sends the multiplexed data back to the host (block 1145).

It is contemplated that "R" is determined by the INBM algorithm and the M-TCM decoder can be replaced by an OFDM decoder or another type of decoder that matches the encoding technique at the transmitter.

The INBM function may be described as follows:

A null-search generator (NSG) produces RF tones whose frequencies range from "fmin" to "fmax". At module startup, the RF combiner output is disable and the algorithm proceeds as follows:

```
Count=0
Null vector is empty
For f=fmin to fmax
    The NSG generates RF tone T(f) which modulates
    the intensity of the light source
    Tone T(f) stays on for a pre-defined time
    interval
    The Null-search detector (NSD) detects the
    presence of tone T(f) as shown in the RX
    diagram
    If tone_detect=false
        Count=count+1
        null(count)=f
    Endif;
End
```

The Null vector is transmitted back to TX via a supervisory channel. The information in the null vector includes the following:
(1) provides information about the number of channel nulls caused by dispersion and their location;
(2) can be used to determine the center frequency fi and bandwidth BWi of both TX & RX BPFs;
(3) dictates how many blocks Bi are needed at the TX & RX;
(4) Is used along with the required data rate by the M-TCM encoder to fix constellation size;
(5) Once the TX/RX parameters are determined (number of blocks, block size, center frequency and BW of BPFs, constellation size of the M-TCM encoder), the NSG and NSD are disabled and the RF combiner is activated.

Figure 12:
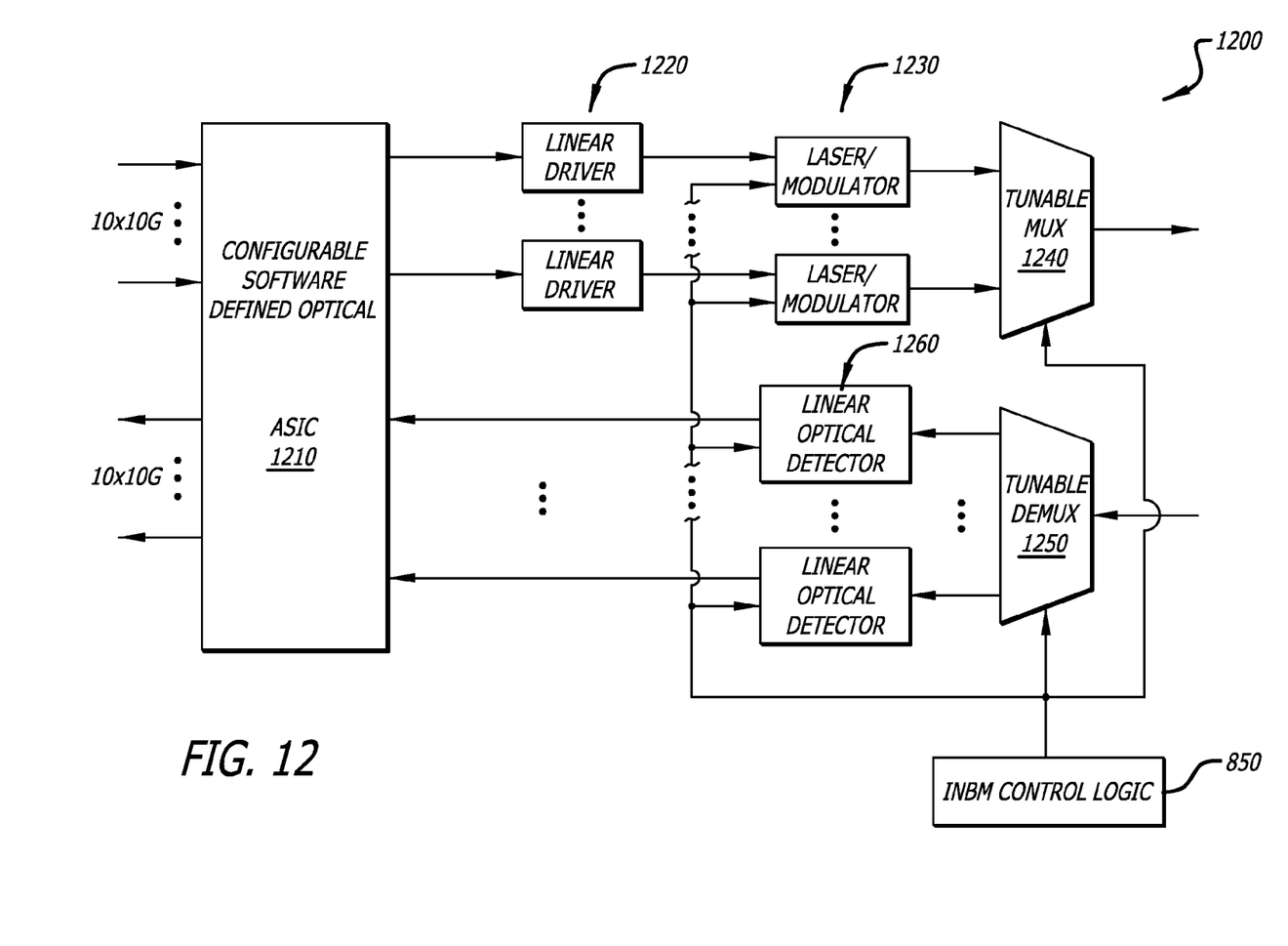
FIG. 12 illustrates an exemplary embodiment of transmitter and receiver logic for supporting inter-null frequency using optical carriers.

FIG. 12 illustrates an embodiment of an optical transceiver 1200 that comprises transmitter logic and receiver logic. Herein, in lieu of relying on RF carriers for data propagation as set forth in FIGS. 6A-6B & 7-8, optical carriers are used. The spacing between optical carriers is set so that the frequency spacing between neighboring optical carriers is equal to twice the frequency up to the first channel null (hereinafter "the first null channel frequency"). Therefore, the number of optical carriers is dependent on the selected data rate and fiber length.

As an illustrative example, processing logic (e.g. ASIC 1210) of optical transceiver 1200 is adapted to receive data over "N" (e.g. 10) channels, each at 10 gigabits per second (Gbps), to support N×10 Gbps transmissions. According to one embodiment, the data may be provided from a host device such as a computing device (e.g., router, computer, main frame, server, access point, etc.), processing circuitry or the like. Processing logic 1210 performs signal processing on the received data. Thereafter, the data is provided to transmitter logic that comprises one or more laser drivers 1220 along with one or more corresponding tunable laser sources and optical modulators ("laser/modulator") 1230.

Herein, for "p" laser/modulators (p>1), each laser/modulator is tuned at a frequency spaced from each other by twice the first null channel frequency. For instance, where a first laser/modulator $1230_1$ is associated with an optical carrier set to 12.5 gigahertz "GHz" (where first null channel frequency is equal to 6.25 GHz), the P$^{th}$ laser/modulator 1230$_p$ has an optical carrier set to p*12.5 GHz. The spacing between each optical carrier is equal to twice the first null channel frequency.

INBM control logic 850 is adapted to control selection of multiplexer 1240 and activation/deactivation of each of the laser/modulators 1240.

As further shown in FIG. 12, receiver logic comprises a demultiplexer 1250 and optical detectors 1260 that are controlled by INBM control logic 850 as well. Each of the optical detectors 1260 is associated with an optical carrier and these optical carriers are spaced from each other by twice the first null channel frequency as well.

While the invention has been described in terms of several embodiments, the invention should not be limited to only those embodiments described, but can be practiced with modification and alteration within the spirit and scope of the appended claims.

What is claimed is:

1. A fiber optic communications system that comprises:
    a receiver having a photo-sensor that provides a receive signal representing intensity of light received from an optical fiber; and
    a transmitter that transmits a channel characterization signal over the optical fiber, said characterization signal covering a frequency range between a minimum frequency and a maximum frequency,
    wherein the receiver determines from the receive signal a frequency position for each null in said frequency range based, at least in part, on a length and a distortion coefficient of the optical fiber.

2. The system of claim 1, wherein the receiver determines the frequency position for each null in accordance with a type of optical fiber that exceeds 200 kilometers in length.

3. The system of claim 2, wherein the transmitter employs an orthogonal frequency division multiplexing (OFDM) modulator with frequency bins corresponding to said null frequency positions being zeroed out.

4. The system of claim 2, wherein the receiver assembles a data stream for a host by collecting data from blocks, each block corresponding to a channel and having a size based at least in part on a bandwidth of said channel.

5. The system of claim 4, wherein each of the parallel demodulators have independent timing recovery modules.

6. The system of claim 4, wherein each of the parallel demodulators have independent equalization modules.

7. The system of claim 4, wherein each of the parallel demodulators have independent M-TCM decoders.

8. The system of claim 2, wherein the receiver divides the receive signal using a set of bandpass filters each having a programmable center frequency and bandwidth that are set based on the null frequency positions, wherein the filtered receive signals are processed by a set of parallel demodulators.

9. The system of claim 1, wherein, based on the null frequency positions, the transmitter divided said frequency range into channels and spreads data from a host into blocks, each block corresponding to a channel and having a size corresponding to a capacity of that channel.

10. The system of claim 1, wherein, based on the null frequency positions, the transmitter divides said frequency range into channels and spreads data from a host across a set of parallel modulators, each modulator generating a signal for a corresponding channel.

11. The system of claim 10, wherein each modulator signal is filtered by a respective bandpass filter having a programmable center frequency and bandwidth, said center frequency and bandwidth being set based on the null frequency positions.

12. The system of claim 10, wherein the transmitter includes an RF combiner that combines the modulator signals to form a transmit signal, and wherein the transmitter further includes an optical modulator that communicates the transmit signal over the optical fiber.

13. The system of claim 10, wherein the set of parallel modulators include at least one multi-dimensional Trellis-coded modulator (M-TCM).

14. The system of claim 13, wherein the M-TCM modulator employs a PSK or QAM signal constellation that carries more than 2 bits per symbol.

15. The system of claim 13, wherein a partial-response precoder and modulator are used with the M-TCM modulator to further increase the bits-per-symbol rate.

16. The system of claim 13, wherein each M-TCM modulator is coupled to a signal conditioner that at least partly compensates for expected channel effects.

17. The system of claim 10, wherein the set of parallel modulators include at least one orthogonal frequency division multiplexing (OFDM) modulator.

18. The system of claim 1, wherein the receiver determines the frequency position for each null in said frequency range based, at least in part, on the length and the distortion coefficient of the optical fiber in accordance with an equation $$f = \frac{1}{2\pi}\sqrt{\frac{(2k+1)\pi}{\beta_2 z}},$$

where "z" constitutes the length and $\beta_2$ constitutes the distortion coefficient.

19. A fiber optic communications method comprising:
    dynamically identifying frequencies at which spectral nulls occur in a signal received via an optical fiber, the frequencies at which the spectral nulls occur are estimated based, at least in part, on a length and a distortion coefficient of the optical fiber; and
    segregating communications over the optical fiber into a set of inter-null bands defined by the spectral nulls.

20. The method of claim 19, wherein said segregating includes using, for each inter-null band, a respective modulator to generate an analog transmit signal and a respective demodulator to process an analog receive signal, said analog signals being frequency-limited to that inter-null band.

21. The method of claim 19, further comprising setting center frequencies and bandwidths for a set of bandpass filters that conduct frequency limiting of analog transmit signals for the inter-null bands.

22. The method of claim 19, further comprising setting center frequencies and bandwidths for a set of bandpass filters that conduct frequency limiting of analog receive signals for the inter-null bands.

23. The method of claim 19, wherein the frequencies at which the spectral nulls occur are estimated in accordance with a type of optical fiber that exceeds 200 kilometers in length.

24. A method comprising:
    dynamically identifying frequencies at which spectral nulls occur in a signal received via a single-mode optical fiber that corresponds to a long-haul optical communication link, the frequencies at which the spectral nulls occur are identified based, at least in part, on a length and a distortion coefficient of the optical fiber; and segregating communications over the optical fiber into a set of inter-null bands each associated with an optical carrier, the optical carriers each being separated from each other by twice a frequency of a first channel null for a first inter-null band of the set of inter-null bands.

* * * * *